US012128861B2

United States Patent
Carrara et al.

(10) Patent No.: US 12,128,861 B2
(45) Date of Patent: Oct. 29, 2024

(54) BRAKE CALIPER FOR DISC BRAKE

(71) Applicant: BREMBO S.p.A., Curno (IT)

(72) Inventors: Marco Carrara, Curno (IT); Paolo Sala, Curno (IT); Luca D'Urso, Curno (IT); Mauro Reolon, Curno (IT)

(73) Assignee: Brembo S.p.A., Bergamo (IT)

( * ) Notice: Subject to any disclaimer, the term of this patent is extended or adjusted under 35 U.S.C. 154(b) by 376 days.

(21) Appl. No.: 17/610,767

(22) PCT Filed: May 11, 2020

(86) PCT No.: PCT/IB2020/054414
§ 371 (c)(1),
(2) Date: Nov. 12, 2021

(87) PCT Pub. No.: WO2020/229989
PCT Pub. Date: Nov. 19, 2020

(65) Prior Publication Data
US 2022/0306066 A1    Sep. 29, 2022

(30) Foreign Application Priority Data

May 13, 2019   (IT) .......................... 102019000006766

(51) Int. Cl.
*B60T 13/74* (2006.01)
*F16D 55/00* (2006.01)
(Continued)

(52) U.S. Cl.
CPC .......... *B60T 13/746* (2013.01); *F16D 55/226* (2013.01); *F16D 65/0068* (2013.01);
(Continued)

(58) Field of Classification Search
CPC .... B60T 13/746; F16D 55/225; F16D 55/226; F16D 65/18; F16D 65/0068;
(Continued)

(56) References Cited

U.S. PATENT DOCUMENTS 6,325,180 B1 *  12/2001  De Vries ................. F16C 33/60
                                                       188/162
6,367,592 B1 *   4/2002  Kapaan .................... H02K 7/06
                                                       188/162
(Continued)

FOREIGN PATENT DOCUMENTS

WO    WO-9937010 A1 *  7/1999  ............. F16D 65/18
WO    2011076299 A1    6/2011
(Continued)

OTHER PUBLICATIONS

European Patent Office, International Search Report, issued in PCT/IB2020/054414, Jul. 28, 2020, Rijswijk, Netherlands.

*Primary Examiner* — Robert A. Siconolfi
*Assistant Examiner* — San M Aung
(74) *Attorney, Agent, or Firm* — Marshall & Melhorn, LLC

(57) ABSTRACT

A brake caliper for a disc brake has a caliper body straddling a brake disc. The caliper body has a thrust device housing accommodating a thrust device configured to apply a bias on at least one brake pad to abut the at least one brake pad against braking surfaces of the brake disc. The thrust device is operatively connected to a translating screw nut. The translating screw nut is operatively connected to a worm. The worm is operatively connected to a gearbox and rotatably supported by a screw thrust bearing configured to apply for the worm an axial reaction. At least one part of the gearbox is rotatably supported by at least one gearbox thrust bearing configured to apply for the at least one part of the gearbox a radial reaction. The screw thrust bearing and the gearbox thrust bearing are a same thrust bearing.

9 Claims, 5 Drawing Sheets

(51) Int. Cl.
*F16D 55/226* (2006.01)
*F16D 65/00* (2006.01)
*F16D 65/18* (2006.01)
*F16D 121/24* (2012.01)
*F16D 125/40* (2012.01)
*F16D 125/50* (2012.01)
*F16D 125/52* (2012.01)

(52) U.S. Cl.
CPC ...... *F16D 65/18* (2013.01); *F16D 2055/0016* (2013.01); *F16D 2121/24* (2013.01); *F16D 2125/40* (2013.01); *F16D 2125/50* (2013.01); *F16D 2125/52* (2013.01)

(58) Field of Classification Search
CPC ......... F16D 2055/0016; F16D 2121/24; F16D 2125/40; F16D 2125/50; F16D 2125/52
USPC ....................................................... 188/72.8
See application file for complete search history.

(56) References Cited

U.S. PATENT DOCUMENTS

| | | |
|---|---|---|
| 6,607,059 B1 | 8/2003 | Kapaan et al. |
| 7,021,415 B2 | 4/2006 | Farmer et al. |
| 8,051,957 B2 | 11/2011 | Giering et al. |
| 2005/0034936 A1 | 2/2005 | Drennen et al. |
| 2008/0271553 A1* | 11/2008 | Wang ............... F16D 65/18 74/89.34 |
| 2016/0032993 A1* | 2/2016 | Takei ............... F16D 65/18 188/162 |

FOREIGN PATENT DOCUMENTS

| | | |
|---|---|---|
| WO | 2015151052 A1 | 10/2015 |
| WO | 2016005867 A2 | 1/2016 |

* cited by examiner

BRAKE CALIPER FOR DISC BRAKE

CROSS-REFERENCE TO RELATED APPLICATIONS

This application is a National Phase Application of PCT International Application No. PCT/IB2020/054414, having an International Filing Date of May 11, 2020 which claims priority to Italian Application No. 102019000006766 filed May 13, 2019, each of which is hereby incorporated by reference in its entirety.

FIELD OF THE INVENTION

The present invention relates to a disc brake caliper and a disc brake comprising said caliper.

Hereafter, the disc brake caliper and a disc brake assembly will be described referring to the rotation axis of the disc itself, indicated by reference X-X, which defines an axial direction. Axial direction means any direction A-A directed parallel to the rotation axis of the brake disc. Additionally, radial direction means all directions orthogonal to rotation axis X-X and incident therewith. Furthermore, circumferential direction C-C means the circumference orthogonal to the axial direction and the radial directions.

Otherwise, tangential direction T-T means a direction which is punctually orthogonal to an axial direction A-A and a radial direction R-R.

Prior Art

On vehicles, in particular, in a disc brake, the brake caliper is arranged straddling the outer peripheral margin of a brake disc. The brake caliper usually comprises a body having two elongated elements, named side portions, which are arranged to face opposite braking surfaces of a disc. There are friction pads between each side portion of the caliper and the braking surfaces of the brake disc. At least one of the side portions of the caliper has cylinders adapted to accommodate pistons, actuated in any suitable known manner (e.g. hydraulic or electro-mechanical pistons), capable of applying a thrust action on the pads, abutting them against the braking surfaces of the disc to apply the braking action on the vehicle.

Brake calipers are usually constrained to a supporting structure which remains fixed to the vehicle, such as, for example, a spindle of a vehicle suspension.

In a typical arrangement, one of the two side portions has two or more attachment portions of the body of the caliper to the supporting structure, e.g. providing slots or eyelets, e.g. arranged axially, or through holes, e.g. arranged radially, adapted to receive screws for fixing the caliper which are received in threaded holes provided on the caliper support with their ends.

Such side portion is called attachment side portion or vehicle-side elongated element.

The other portion is called non-attachment side portion or elongated wheel-side elements.

In a typical caliper body construction, the side portions facing the braking surfaces of the disc are connected to each other by bridge-like elements arranged straddling the disc, named bridges.

As said, opposite pads are pressed in disc brake calipers, by virtue of the action of at least one piston, against opposite braking surfaces of a braking band of a braking band by the associable brake disc.

This piston is usually accommodated in a cylinder in the body of the caliper and is energized by brake fluid pressurized by a brake pump, usually a pedal in cars and a lever on motorcycles.

Brake calipers are also known in which the piston, or the pistons, is or are electro-mechanically energized, e.g. by the rotation of a worm accommodated in the piston body and turned by an electric motor, or more commonly by a ratio motor.

Such a solution is known from U.S. Pat. No. 6,607,059B1 by SKF Engineering and Research Center B.V. In one embodiment, this document discloses a ratio motor connected to a ball screw located inside the piston body. The worm is rotationally supported by a first thrust bearing placed inside it and a transmission shaft connects it to a planet gear disc of an epicyclic gearbox placed over an electric motor. This epicyclic gearbox is supported by a second thrust bearing at the end of the drive shaft opposite to said piston.

This solution is therefore extremely cumbersome, above all due to its considerable axial extension.

A solution to this problem is published in U.S. Pat. No. 7,021,415B2 by Stoneridge Control Devices, Inc. and in WO2015151052 by Brembo Brakes S.p.A. These documents disclose an electrically operated brake system and actuator. The actuator comprises a motor with a motor shaft, and a gear train coupled to the motor shaft, in which the gear has at least one mechanical output from the actuator. The gear train includes a gear coupled to the drive shaft, a driven gear coupled to the driven gear and a planetary gear set coupled to the driven wheel. These documents describe configurations to arrange the gear train as wide as possible in the circumferential direction and thus reduce the axial footprint of the assembly.

Other such solutions are known from U.S. Pat. No. 8,051,957B2, WO2011076299A1, WO2015151052A1, WO2016005867A2, US2005034936A1, US2008271553A1.

All these solutions, however, do not allow to reduce the axial encumbrance of the caliper mainly due to the side-by-side arrangement of the piston assembly and worm-nut screw and the gearbox.

Therefore, the need remains strongly felt for a caliper of the type with a thrust device actuated through a screw-nut screw and which has a reduced axial dimension.

This requirement is also strongly felt for motorcycles on which the axial dimensions of the caliper are a major constraint to the desired reduced width of the vehicle itself, but above all to its maneuverability.

Solution

These and other objects are achieved by a caliper and a brake as described and claimed herein.

Some advantageous embodiments are the object of the dependent claims.

This solution makes it possible to significantly reduce the axial dimensions of the caliper by virtue of the integration of its components.

By virtue of the suggested solutions, the components of the gearbox are at least partially keyed with the components of the thrust device, allowing a significant reduction in the size of the assembly, particularly in the axial direction.

The tests carried out on the solutions revealed that the achieved reduction in the axial dimension could not have been obtained in any of the previously known solutions.

On the contrary, precisely because of the needs expressed by these previously known solutions, i.e. to suggest modular solutions in which the gearbox can be easily and simply separated from the caliper body, the known solutions suggest assemblies which are increasingly cumbersome in the axial direction, precisely because of the refined desire to separate the components of the thrust device from those of the gearbox or ratio motor.

In particular, the design of the worm and the gearbox supports is exemplified, to the point of eliminating the motion transmission components from the gearbox to the worm, by directly using the worm support bearing to transmit motion from the gearbox to the worm.

Furthermore, by virtue of the proposed solutions, it is possible to have a reduction in the number of components which form the caliper. In particular, with this suggested solution, the support bearing of the worm also incorporates the function of supporting bearing of the gearbox or a proximal part of the gearbox, making it possible to further eliminate the number of components which allowed the gearbox support bearing to be fitted.

These solutions also allow a considerable simplification of the caliper assembly phases.

FIGURES

Further features and advantages of the invention will be apparent from the description provided below of preferred embodiments thereof, given by way of non-limiting examples, with reference to the accompanying drawings, in which.

DESCRIPTION OF SOME PREFERRED EMBODIMENTS

Figure 1:
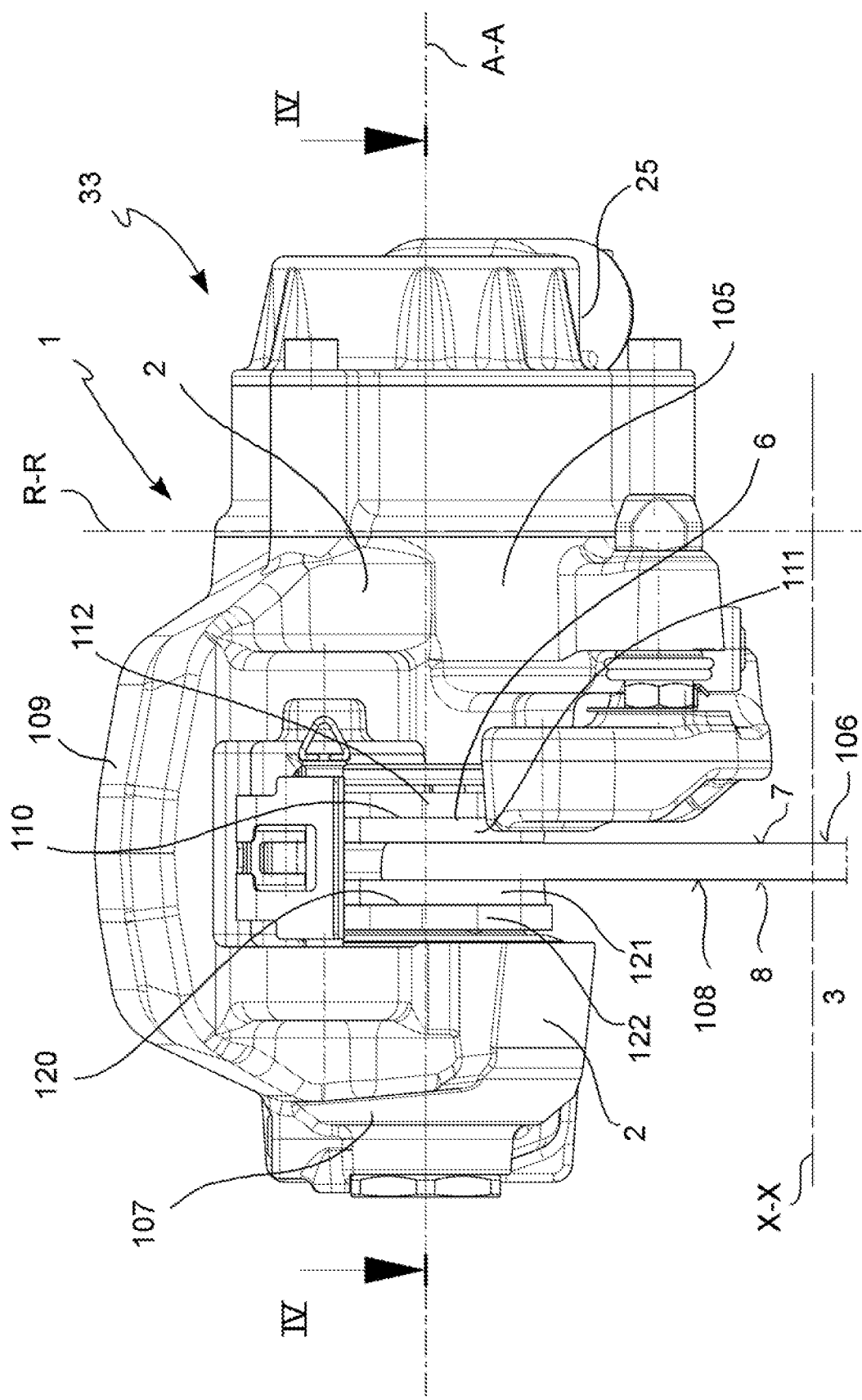
FIG. 1 is a circumferential view of a brake caliper according to the invention.
Figure 2:
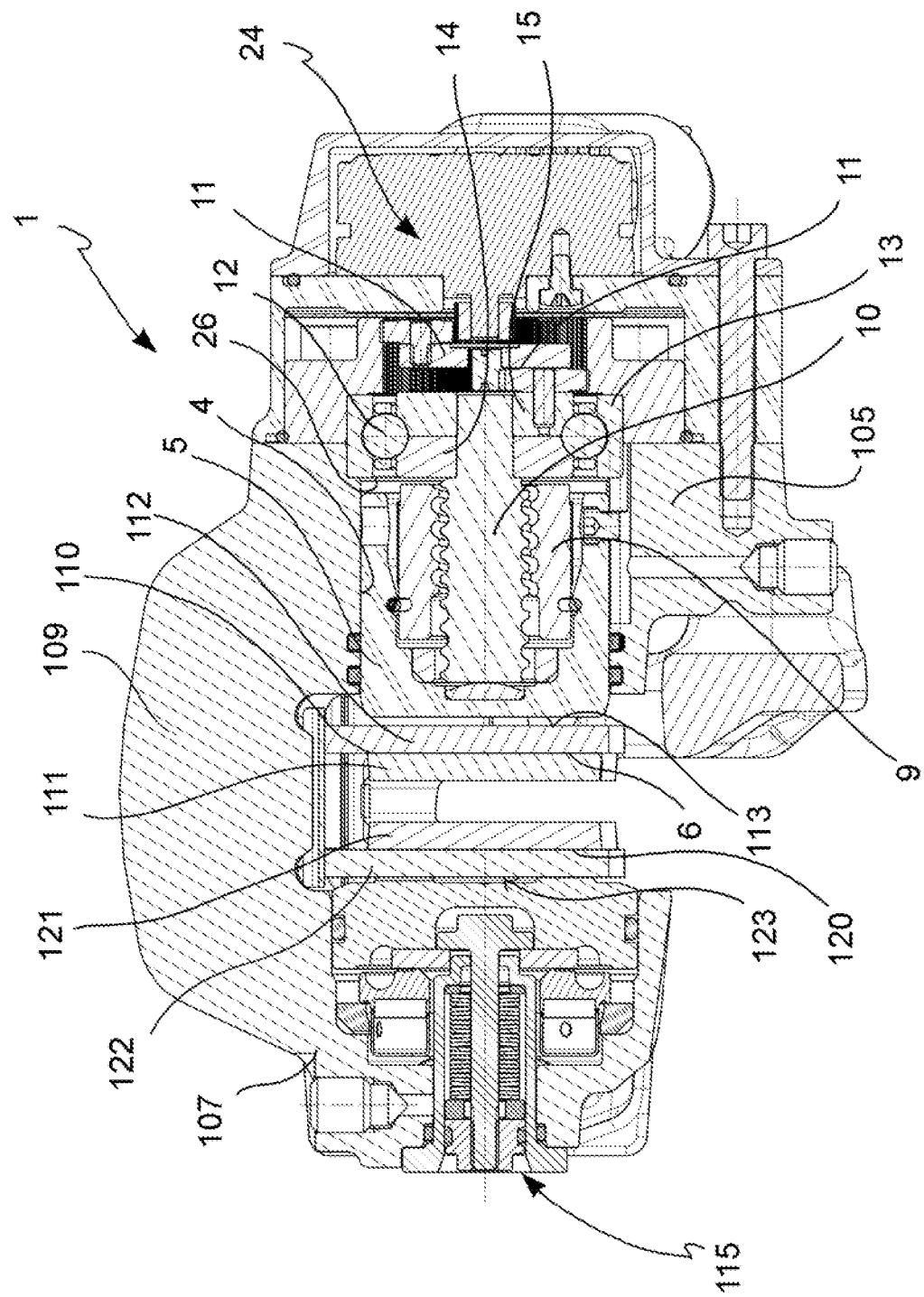
FIG. 2 shows a section along a radial axial plane of the caliper in FIG. 1.
Figure 3:
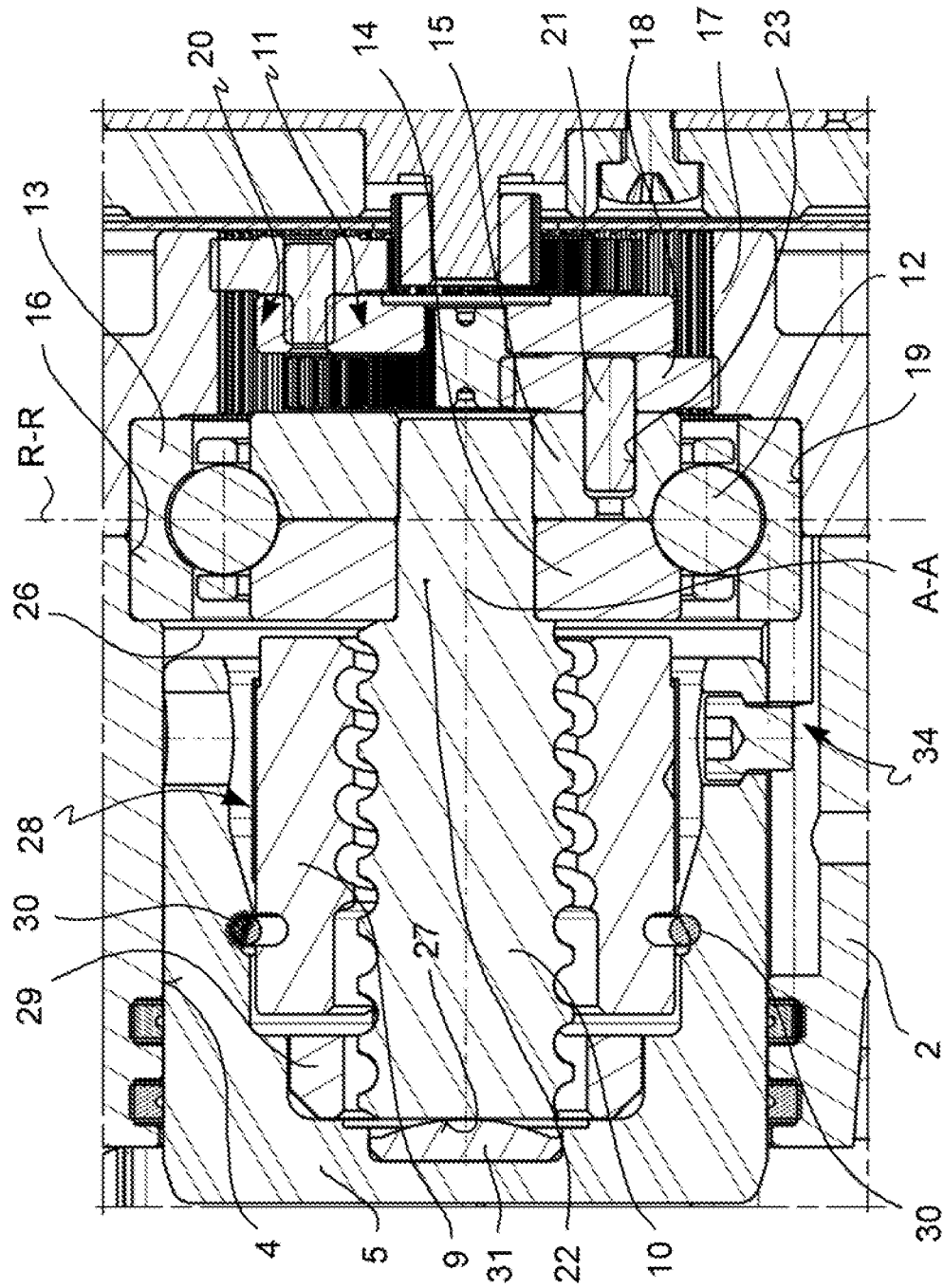
FIG. 3 shows an enlarged detail of the section in FIG. 2, in which the support bearing of the worm and the end part of the gearbox are highlighted.
Figure 4:
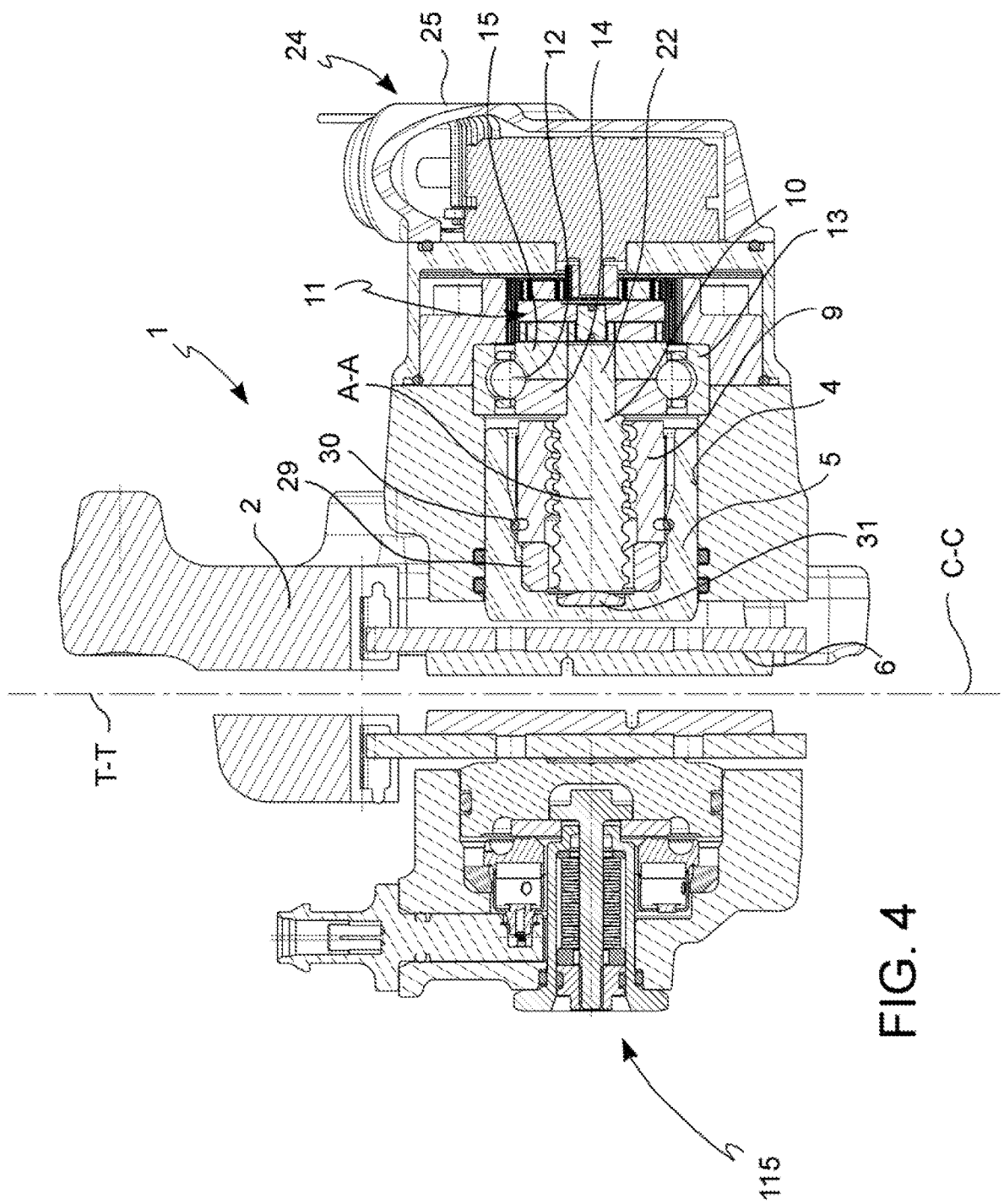
FIG. 4 shows a section view taken along line IV-IV in FIG. 1 of the caliper in FIG. 1.
Figure 5:
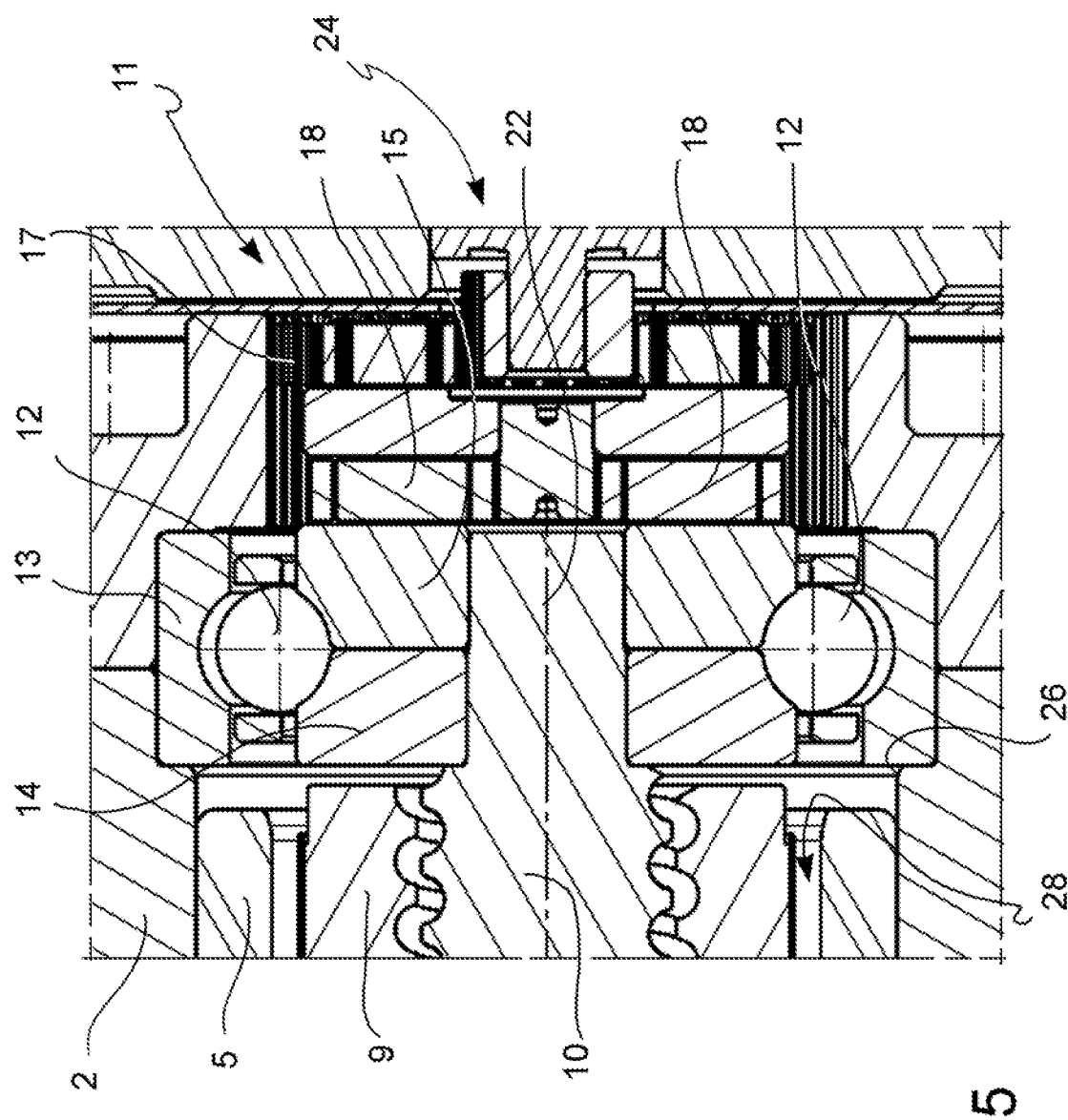
FIG. 5 shows an enlargement of a detail in FIG. 4, in which the support bearing of the worm and the end part of the gearbox are highlighted.

According to a general embodiment, a brake caliper of a disc brake 1 comprises a caliper body 2 adapted to be arranged straddling a brake disc 3 to apply a braking action on a vehicle.

Said brake disc 3 defining an axial direction A-A directed either along or parallel to the rotation axis X-X of said brake disc 3; a radial direction R-R orthogonal to said axial direction A-A and a circumferential direction C-C orthogonal to said axial A-A and radial R-R directions, as well as a tangential direction T-T locally orthogonal to said axial direction A-A and said radial direction R-R and tangent to said circumferential direction C-C.

Said caliper body 2 comprising at least one thrust device housing 4 which accommodates a thrust device 5 adapted to apply a bias on at least one brake pad 6 to abut said at least one brake pad 6 against the braking surfaces 7, 8 of said brake disc 3.

Said thrust device 5 is operatively connected to a translating screw nut 9; operatively connected to a worm 10; said translating screw nut 9 is operatively connected to a worm 10; said worm 10 is operatively connected to a reducer, or gearbox, indicated with 11.

Said worm 10 is rotatably supported by a screw thrust bearing 12 adapted to support in rotatable manner said worm 10 and to apply by said worm 10 an axial reaction, i.e. a direct reaction prevalently along said axial direction A-A.

At least part of said pressure gearbox 11 placed near and operatively connected to said worm 10 is rotatably supported by at least one gearbox thrust bearing 12 adapted to support in rotatable manner said at least one part of said reduction gear 11 and apply for said at least one part of said reduction gear 11 a radial reaction, that is a direct reaction prevalently along said radial direction R-R.

Advantageously, said screw thrust bearing and said gearbox thrust bearing are the same thrust bearing 12. In other words, said screw thrust bearing and said gearbox thrust bearing are the same thrust bearing 12.

By virtue of the provision of a single thrust bearing 12 to perform both the function of a worm support bearing and a gearbox support bearing, for example, the felt need to simplify the construction of this assembly and reduce its axial dimensions is solved.

According to a yet further general embodiment, a brake caliper of disc brake 1 comprises a caliper body 2 adapted to be arranged straddling a brake disc 3 to apply a braking action on a vehicle.

Said brake disc 3 defining an axial direction A-A directed either along or parallel to the rotation axis X-X of said brake disc 3; a radial direction R-R orthogonal to said axial direction A-A and a circumferential direction C-C orthogonal to said axial A-A and radial R-R directions, as well as a tangential direction T-T locally orthogonal to said axial direction A-A and said radial direction R-R and tangent to said circumferential direction C-C.

Said caliper body 2 comprising at least one thrust device housing 4 which accommodates a thrust device 5 adapted to apply a bias on at least one brake pad 6 to abut said at least one brake pad 6 against the braking surfaces 7, 8 of said brake disc 3.

Said thrust device 5 is operatively connected to a translating screw nut 9; operatively connected to a worm 10; said translating screw nut 9 is operatively connected to a worm 10; said worm 10 is operatively connected to a gearbox 11.

Said worm 10 is rotatably supported by a screw thrust bearing 12 adapted to support in rotatable manner said worm 10 and to apply by said worm 10 an axial reaction, i.e. a direct reaction prevalently along said axial direction A-A.

At least part of said pressure gearbox 11 placed near and operatively connected to said worm 10 is rotatably supported by at least one gearbox thrust bearing 12 adapted to support in rotatable manner said at least one part of said reduction gear 11 and apply for said at least one part of said reduction gear 11 a radial reaction, that is a direct reaction prevalently along said radial direction R-R.

Said thrust bearing 12 comprises at least one inner bearing ring or radially inner slewing ring 14, 15.

Said gearbox 11 comprises an epicyclic gear 20.

Said epicyclic gear 20 comprises a fixed gear or an internally toothed body 17 which cooperates with at least one planet gear 18, and wherein said at least one planet gear 18 is rotatably supported about at least one planet gear pin 21.

Said at least one planet gear pin 21 is operatively connected to said at least one radially inner slewing ring 15 to transmit the action of said gearbox 11 to said worm 10 by means of said at least one radially inner slewing ring 15.

According to an embodiment, said worm 10 is rotatably supported only by said thrust bearing 12.

According to an embodiment, said thrust bearing 12 is a bearing of the oblique type adapted to support both loads directed along the axial direction A-A and loads directed along the radial direction R-R.

According to an embodiment, said worm 10 is a recirculating ball worm.

According to an embodiment, said thrust bearing 12 comprises at least one radially inner slewing ring 14, 15.

According to an embodiment, said gearbox 11 comprises at least one epicyclic gear 20.

Said epicyclic gear 20 comprises a fixed gear or an internally toothed body 17 which cooperates with at least one planet gear 18, and wherein said at least one planet gear 18 is rotatably supported about at least one planet gear pin 21.

Said at least one planet gear pin 21 is operatively connected to said at least one radially inner slewing ring 15.

According to an embodiment, said at least one radially inner slewing ring 15 comprises at least a pin housing 23 and said at least one pin housing 23 receives said at least one planet gear pin 21.

According to an embodiment, said at least one radially inner slewing ring 14, 15 is connected to said worm 10.

According to an embodiment, said worm 10 comprises a screw shank 22; said at least one radially inner slewing ring 14, 15 is connected to said screw shank 22 to transmit the action of said gearbox 11 to said worm 10 by means of said at least one radially inner slewing ring 14, 15.

According to an embodiment, said worm 10 comprises a screw shank 22; said at least one radially inner slewing ring 14, 15 is keyed to said screw shank 22 to transmit the action of said gearbox 11 to said worm 10 through said at least one radially inner slewing ring 14, 15.

According to an embodiment, said gearbox 11 comprises at least one epicyclic gear 20.

Said epicyclic gear 20 comprises a fixed gear or an internally toothed body 17 which cooperates with at least one planet gear 18, and said at least one planet gear 18 is rotatably supported about at least one planet gear pin 21;

Said at least one planet gear pin 21 is supported by a planet carrier disc.

Said at least one radially inner slewing ring 15 is in one piece with said planet carrier disc.

According to an embodiment, said thrust bearing 12 comprises at least one outer bearing ring or radially outer slewing ring 13.

According to an embodiment, said radially outer slewing ring 13 is connected to a first outer slewing ring housing 16 provided at least partly in said caliper body 2.

According to an embodiment, said gearbox 11 comprises a fixed gear or an inner toothed body 17 which cooperates with rotating or planet gears 18; said fixed gear or inner toothed body 17 is connected to said caliper body 2; said radially outer slewing ring 13 is connected to a second outer slewing ring housing 19 at least partly provided in said fixed gear or inner toothed body 17.

According to an embodiment, thrust bearing 12 comprises at least one radially inner slewing ring 14, 15.

At least one radially inner slewing ring 14, 15 is in one piece with said worm 10.

According to an embodiment, said worm 10 comprises a screw shank 22; said at least one radially inner slewing ring 14, 15 is in one piece with said screw shank 22 to transmit the action of said gearbox 11 to said worm 10 through said at least one radially inner slewing ring 14, 15.

According to an embodiment, said at least one radially inner slewing ring 14, 15 is a first inner slewing ring 14 and a second inner slewing ring 15 mutually side-by-side.

According to an embodiment, said second inner slewing ring 15 is operatively connected to said gearbox 11.

According to an embodiment, said gearbox 11 comprises at least one epicyclic gear 20.

Said second inner slewing ring 15 comprises at least one pin housing 23 and said at least one pin housing 23 receives at least one planet gear pin 21 which rotatably supports at least one planet gear 18 of said epicyclic gear 20.

According to an embodiment, said gearbox 11 is a part of a ratio motor 24 which comprises an electric motor 25 operatively connected to said gearbox 11.

According to an embodiment, said brake caliper 1 is an electrically actuated caliper.

According to an embodiment, said thrust device housing 4 has an insertion opening 26, said insertion opening 26 opens towards said gearbox 11 and allows the insertion in said pin device housing 4 of said thrust device 5 and/or of said translating screw nut 9 and said worm 10.

According to an embodiment, said thrust device 5 comprises a thrust device inner chamber 28.

Said thrust device inner chamber 28 accommodates said translation screw 9 and said worm 10.

According to an embodiment, a support ring 29 is interposed between said thrust device 5 and said translation screw 9; and wherein said translating screw nut 9 rests on said resting ring 29, so as to contain the clearance of said thrust device 5 and of said translation screw nut 9.

According to an embodiment, said translating screw nut 9 comprises at least one snap coupling device 30.

According to an embodiment, said snap coupling device 30 connects by snapping said translation nut screw 9 to said thrust device 5.

According to an embodiment, said worm 10 comprises a screw thrust head 27 adapted to cooperate either directly or indirectly with said thrust device 5.

According to an embodiment, a limit stop disc 31 is provided interposed between said thrust device 5 and said screw thrust head 27.

According to an embodiment, said limit stop disc 31 is shaped as a spherical cap 32.

The present invention further relates to a disc brake 33 comprising a caliper according to any one of the embodiments described above and associated with a brake disc 3.

The person skilled in the art may make many changes and adaptations to the embodiments described above or may replace elements with others which are functionally equivalent in order to satisfy contingent needs without however departing from the scope of the appended claims.

According to an embodiment, the thrust device 5 comprises a retaining device 34 which can prevent the rotation of the thrust device 5 in the housing of the thrust device 4.

According to an embodiment, a brake caliper 1 comprises a caliper body 2 adapted to straddle the disc 3, wherein said caliper body 2 comprises:
- a first elongated portion 105 adapted to face a first braking surface 106 of the brake disc 3, and
- a second elongated portion 107, opposite to said first elongated portion 105 and adapted to face a second braking surface 108 of the brake disc 3 opposite to said first braking surface 106, and
- at least one bridge 109 which connects said first elongated portion 105 and said second elongated portion 107 to each other arranged straddling the disc 3.

Said brake caliper 1 further comprises at least one pair of opposite brake pads, comprising a first brake pad 110 and a second brake pad 120.

Each brake pad 110, 120 of said at least one pair of opposite brake pads comprises:
 friction material 111, 121, and
 a support plate 112, 122, which supports said friction material 111, 121.

Each support plate 112, 122 of each brake pad 110, 120 comprises a plate back 113, 123 facing a respective elongated portion of said elongated portions 105, 107 of the caliper body 2.

Said brake caliper 1 further comprises:
 at least one thrust device 5, adapted to apply a thrust action on said plate back 113 to abut said first brake pad 110 of said pair of brake pads against a braking surface 106 of said facing braking surfaces 106, 108 of the disc 3;
 at least one detecting device 115, adapted to detect a biasing force directed in axial direction X-X.

Said detecting device 115 of the brake caliper 1 is interposed either directly or indirectly between said plate back 123 of said second brake pad 120 of said pair of brake pads and an elongated portion 107 of the caliper body 2, thereby avoiding the provision of a thrust device 5 interposed between said detecting device 115 and said plate back 123 of said second brake pad 120 of said pair of brake pads.

LIST OF REFERENCES 1 brake caliper for disc brake
2 caliper body
3 brake disc
4 thrust device housing
5 thrust device, e.g. a piston
6 brake pad
7 braking surface
8 braking surface
9 translating nut screw
10 worm, e.g. recirculating ball screw
11 reducer or gearbox
12 thrust bearing
13 radial outer slewing ring or outer bearing ring
14 first radially inner slewing ring or first inner bearing ring
15 second radially inner slewing ring which supports planet
gear pins or second inner bearing ring
16 first outer slewing ring housing
17 fixed gear or an internally toothed body or ring gear
18 planet gears
19 second outer slewing ring housing
20 epicyclic gear
21 planet gear pin
22 screw shank
23 pin housings
24 ratio motor
25 electric motor
26 insertion opening
27 screw thrust head
28 thrust device inner chamber
29 X-X support ring brake disc rotation axis
30 snap engagement device
31 limit stop disc
32 spherical cap
33 disc brake
34 retaining device e.g. anti-rotation device
105 first elongated portion
106 first braking surface
107 second elongated portion
108 second braking surface
109 at least one bridge
110 first brake pad
120 second brake pad
111 friction material
121 friction material
112 support plate
122 support plate
113 plate back
123 plate back
115 axial bias detecting device
A-A axial direction parallel to rotation axis
R-R radial direction orthogonal to rotation axis
C-C circumferential direction orthogonal to axial direction and radial directions
T-T tangential direction punctually orthogonal to a radial direction and axial direction

The invention claimed is:

1. A brake caliper for a disc brake comprising:
a caliper body configured to straddle a brake disc to apply a braking action on a vehicle;
said brake disc defining an axial direction (A-A) directed either along or parallel to a rotation axis (X-X) of said brake disc; a radial direction (R-R) orthogonal to said axial direction (A-A) and a circumferential direction (C-C) orthogonal to said axial (A-A) and radial (R-R) directions, and a tangential direction (T-T) locally orthogonal to said axial direction (A-A) and said radial direction (R-R) and tangent to said circumferential direction (C-C);
said caliper body comprising at least one thrust device housing which accommodates a thrust device configured to apply a bias on at least one brake pad to abut said at least one brake pad against braking surfaces of said brake disc;
wherein:
said thrust device is operatively connected to a translating screw nut; said translating screw nut is operatively connected to a worm; said worm is operatively connected to a gearbox;
said worm is rotatably supported by a screw thrust bearing configured to support in rotatable manner said worm and to apply for said worm an axial reaction, that is a direct reaction prevalently along said axial direction (A-A);
at least one part of said gearbox placed near and operatively connected to said worm is rotatably supported by a gearbox thrust bearing configured to support in rotatable manner said at least one part of said gearbox and apply for said at least one part of said gearbox a radial reaction, that is a direct reaction prevalently along said radial direction (R-R); and wherein
said screw thrust bearing and said gearbox thrust bearing are a same thrust bearing,
wherein said thrust bearing comprises at least one radially inner slewing ring;
said gearbox comprises an epicyclic gear; wherein
said epicyclic gear comprises a fixed gear or an internally toothed body which cooperates with at least one planet gear, and wherein said at least one planet gear is rotatably supported about at least one planet gear pin;
wherein
said at least one planet gear pin is operatively connected to said at least one radially inner slewing ring; wherein said at least one radially inner slewing ring comprises at least one pin housing and said at least one pin housing receives said at least one planet gear pin;

said at least one radially inner slewing ring is connected to said worm; and wherein said worm comprises a screw shank;

said at least one radially inner slewing ring is connected to said screw shank to transmit action of said gearbox to said worm by said at least one radially inner slewing ring; or wherein said worm comprises a screw shank; said at least one radially inner slewing ring is keyed to said screw shank to transmit action of said gearbox to said worm by said at least one radially inner slewing ring.

2. The brake caliper of claim 1, wherein said worm is rotatably supported only by said thrust bearing;

said thrust bearing is a bearing of oblique type adapted to support loads directed along the axial direction (A-A) and loads directed along the radial direction (R-R); and wherein said worm is a recirculating ball worm.

3. The brake caliper of claim 1, wherein said gearbox comprises an epicyclic gear;

said epicyclic gear comprises a fixed gear or an internally toothed body which cooperates with at least one planet gear, and said at least one planet gear is rotatably supported about at least one planet gear pin;

said at least one planet gear pin is supported by a planet carrier disc; and wherein said at least one radially inner slewing ring is in one piece with said planet carrier disc.

4. The brake caliper of claim 1, wherein said thrust bearing comprises at least one radially outer slewing ring;

said radially outer slewing ring is connected to a first outer slewing ring housing at least partly provided in said caliper body; and said gearbox comprises a fixed gear or an internally toothed body which cooperates with rotating or planet gears; said fixed gear or internally toothed body is connected to said caliper body; said radially outer slewing ring is connected to a second outer slewing ring housing at least partly provided in said fixed gear or internally toothed body.

5. The brake caliper of claim 1, wherein said thrust bearing comprises at least one radially inner slewing ring;

said at least one radially inner slewing ring is in one piece with said worm;

said worm comprises a screw shank; said at least one radially inner slewing ring is integral with said screw shank to transmit action of said gearbox to said worm by said at least one radially inner slewing ring;

said at least one radially inner slewing ring is a first inner slewing ring and a second inner slewing ring mutually side-by-side;

said second inner slewing ring is operatively connected to said gearbox;

said gearbox comprises an epicyclic gear; and wherein said second inner slewing ring comprises at least one pin housing and said at least one pin housing receives at least one planet gear pin which rotatably supports at least one planet gear of said epicyclic gear.

6. The brake caliper of claim 1, wherein said gearbox is a part of a ratio motor comprising an electric motor operatively connected to said gearbox, and wherein said brake caliper is an electrically actuated caliper.

7. The brake caliper of claim 1, wherein said at least one thrust device housing comprises an insertion opening, said insertion opening opens towards said gearbox and allows insertion in said at least one thrust device housing of said thrust device and/or of said translating screw nut and said worm;

said thrust device comprises a thrust device inner chamber; and said thrust device inner chamber accommodates said translating screw nut and said worm.

8. The brake caliper of claim 1, wherein a support ring is interposed between said thrust device and said translating screw nut; and wherein said translating screw nut rests on said support ring;

said translating screw nut comprises at least one snap coupling device;

said snap coupling device connects by snapping said translating screw nut to said thrust device;

said worm comprises a screw thrust head configured to cooperate either directly or indirectly with said thrust device;

a limit stop disc is interposed between said thrust device and said screw thrust head; and said limit stop disc is shaped as a spherical cap.

9. A brake disc comprising a brake caliper according to claim 1 and a brake disc.

* * * * *